FREQUENCY SHIFT OSCILLATOR WHICH AVOIDS THE GENERATION OF TRANSIENTS

Original Filed May 23, 1969

INVENTOR
William Frederick Hingston

BY Edward J. Norton
ATTORNEY

United States Patent Office

Re. 27,924
Reissued Feb. 19, 1974

27,924

FREQUENCY SHIFT OSCILLATOR WHICH AVOIDS THE GENERATION OF TRANSIENTS

William Frederick Hingston, Needham, Mass., assignor to RCA Corporation

Original No. 3,618,132, dated Nov. 2, 1971, Ser. No. 827,188, May 23, 1969. Application for reissue Aug. 28, 1972, Ser. No. 284,091
Int. Cl. H03b *5/20;* H03c *3/06*
U.S. Cl. 331—179 7 Claims

Matter enclosed in heavy brackets [ ] appears in the original patent but forms no part of this reissue specification; matter printed in italics indicates the additions made by reissue.

ABSTRACT OF THE DISCLOSURE

A frequency shift oscillator includes a first frequency-determining circuit whereby the oscillator normally functions at a first frequency. A second circuit having input and output terminals is arranged to be switched between predetermined points in the first circuit, shifting the frequency of the oscillator to a second frequency. The predetermined points in the first circuit and the input-output terminals of the second circuit are all maintained at substantially the same constant potential irrespective of whether or not the second circuit is switched between the predetermined points in the first circuit, avoiding the generation of transients which would otherwise occur upon the switching of the second circuit in and out of the first circuit.

This invention relates to an oscillator, and more particularly, to a frequency shift oscillator.

Frequency-shifted oscillators are currently experiencing widespread application in the communication of digital information. One of these applications is concerned with communicating digital information in certain systems which require conversion of the digital information to the audiofrequency range. As a result, numerous techniques have been developed for achieving this end. Generally, these techniques are concerned with converting two-level binary data into audio tones corresponding to the respective binary levels. Some of these techniques include switching between multiple oscillators; switched, phase shift, RC oscillators; voltage-controlled multivibrator oscillators; and variable reactance, phase shift RC oscillators among others. However, the previously known techniques all represent various compromises with data pulse distortion, frequency stability, frequency shift range, circuit complexity, and cost.

Ideally, jitterless data modulation over a wide data speed range, with narrow or wide frequency shifts can be accomplished by an RC phase shift oscillator. However, the problem here is that introduction of variable-frequency-determining elements to change the frequency may also introduce DC transient components into the RC network. Past efforts to resolve this problem in RC networks have met with little success. When an impedance is introduced in an RC network to shift frequencies, two things occur. First, due to its initial condition (having a potential different from that across the RC network), the impedance presents a transient. Second, since the added impedance shunts the original RC network to shift the frequency, the DC potential difference in the combined network would ordinarily shift, and further transients would be introduced due to these shifts in potential. Transients so produced disrupt the wave train generated by the oscillator producing distortion which nullifies the effectiveness of such circuits.

It is an object of the present invention to provide an improved frequency shift oscillator that is substantially free of such transients.

An oscillator is provided herein that includes a frequency-determining circuit such that the oscillator normally functions at a first frequency. Means are provided for selectively changing the parameters of the circuit in a manner to switch the oscillator between the first and a second frequency. The potentials in the circuit which, if permitted to differ with respect to one another, would produce transients upon the oscillator being switched between the first and second frequency, are all maintained substantially constant and equal, avoiding the productions of such transients.

Figure 1:
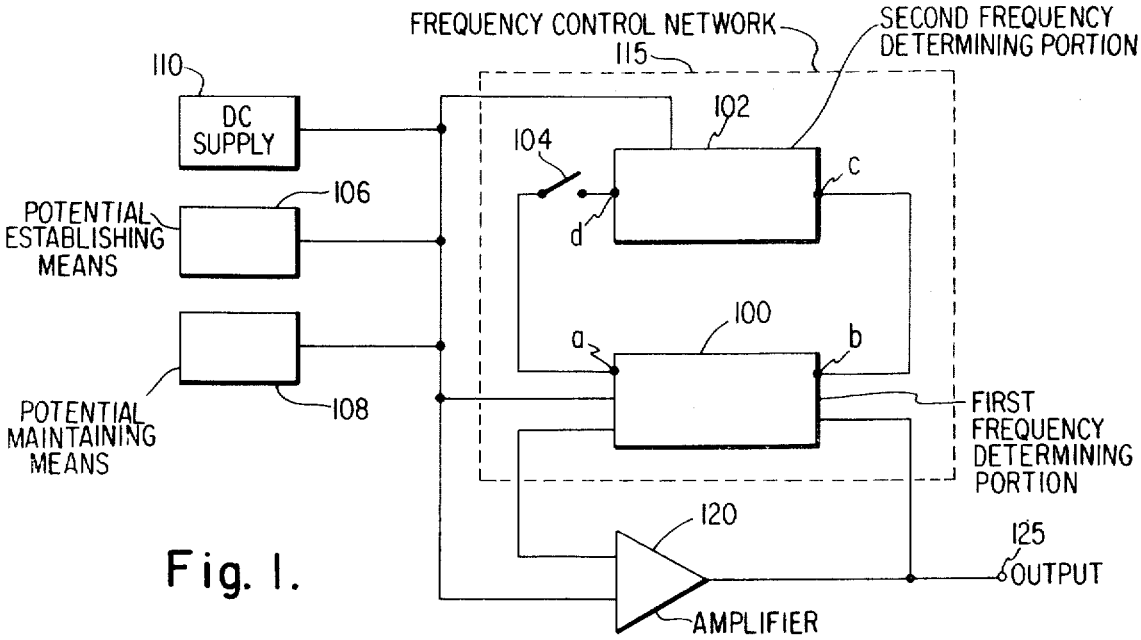
FIG. 1 is a conceptual block diagram of an embodiment of a frequency shift oscillator according to the invention.

In FIG. 1, there is shown an amplifier 120 coupled in series with a first frequency-determining portion 100 of frequency-controlling network 115. The amplifier 120 is selected to have a high output impedance and a low input impedance. The gain of the amplifier 120 is selected in conjunction with the frequency-determining network 115 to provide unity loop gain. Portion or circuit 100 may be an RC frequency-determining grouping. In parallel with the resistance segment of first portion 100 is a second frequency-determining portion or circuit 102 which may be a resistive grouping in series with a two-pole switch 104 having open and closed switch conditions. Portions 100 and 102 have predetermined points located therein such as points (a, b) and (c, d), respectively. These points define the boundaries of the respective resistive segments in portions 100 and 102. Potential-establishing means 106 is shown coupled to the entire circuit as are potential-maintaining means 108 and a DC supply 110.

In the operation of the oscillator shown conceptually in FIG. 1, first portion 100 has an RC grouping that is preselected to generate the first or lower of the two preselected frequencies. When switch 104 is closed, the resistive grouping of second portion 102 is coupled in parallel with the resistive grouping segment of portion 100, presenting a lower resistive frequency-determining value in the network 115, thereby shifting the oscillator to a second or higher frequency. The resistive values between points (a) and (b) in portion 100, and (c) and (d) in portion 102 are selected in accordance with the predetermined frequencies. The output is taken from terminal 125.

Potential-establishing means 106 establishes the DC component of the AC signal at points (a, b, c, and d) to be substantially equal. Potential-maintaining means 106 maintains the DC component of the AC signal at these points substantially constant. Thus when switch 104 is closed, points (a, b, c, and d) will be at the same relative potential, and there will be no initial potential drop across portion 102. However, once the resistive values across points (d) and (c) have been coupled across points (a) and (b), the second resistive value in the network being presented by the combined resistive values of the two portions would ordinarily present a change in potential across the combined portions. This is prevented by means 108. Therefore, there are no significant potential shifts across the frequency-determining portions of network 115, thereby eliminating any transients which would otherwise occur.

Figure 2:
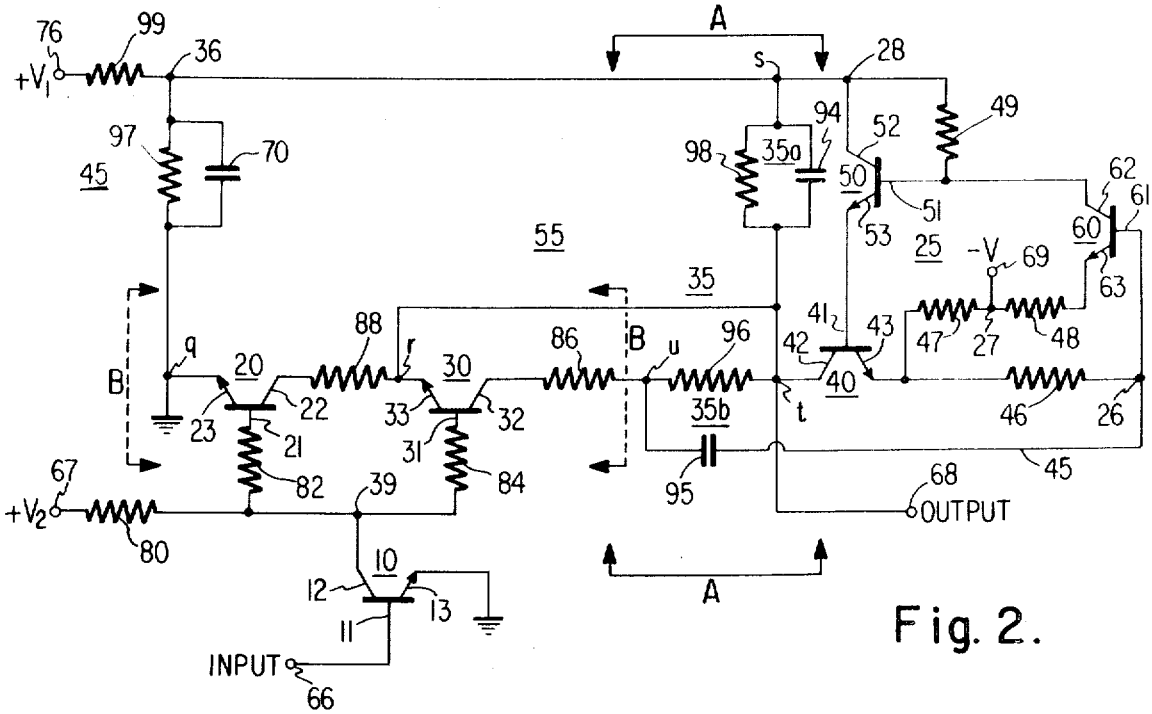
FIG. 2 is a circuit diagram illustrating one form which the embodiment of FIG. 1 may take.

Referring now to FIG. 2, there is shown a frequency shift oscillator of the Wien Bridge type including a non-inverting amplifier 25 consisting of transistors 40, 50, and 60 of the NPN type, such as are found in RCA integrated circuit CA 3046. Base 61 of transistor 60 is connected to a junction 26 as are resistor 46 and capacitor 95. Emitter 63 is connected to resistor 48, which in turn is connected to junction 27 as are resistor 47 and terminal 69 which has a negative potential V (e.g., −7.5 volts) applied thereto. Collector 62 of transistor 60 is connected to resistor 49 and base 51 of transistor 50. Emitter 53 of transistor 50 is connected to base 41 of transistor 40 and emitter 43 of transistor 40 is connected to the other sides of resistors 47 and 46. Collector 52 of transistor 50 is connected to junction 28 as is the other side of resistor 49 and junction 36. Resistors 46, 47, and 48 establish the gain of the amplifier. In addition, these resistors complete a feedback path from junction 26 to emitters 43 and 63. Resistor 49 is the load resistor for collector 62.

Coupled to amplifier 25 is frequency-controlling network 35 consisting of two frequency-determining portions A and B. Portion A has two branches 35a and 35b. Branch 35a includes a resistive segment 98 in parallel with a reactive segment shown as a capacitor 94, one end of the branch 35a being connected to junction (s) as is junction 36. The other end of the branch 35a is connected to junction (t) as is collector 42 of transistor 40, output terminal 68, junction (r) and branch 35b. Resistive segment 96 of branch 35b is connected between junctions (t) and (u), while reactive segment capacitor 95 is serially connected to resistive segment 96 by way of junction 26 and (u).

Potential-establishing means 55 consists of amplifier 15 described above and DC voltage supply $V_1$ (e.g.: +7.5 volts) connected to resistor 99 which in turn is connected to junction 36. Connected to junction 36 is junction (s) and one end of a resistor 97 and of a capacitor 70. The other side of resistor 97 and of capacitor 70 is grounded at junction (q). Capacitor 70 is a low-impedance AC decoupling component and is substantially greater than the value of reactive segment 94 e.g., 100 times). Means 55, together with amplifier 25, establishes the AC potential at predetermined points such as junctions (t and u) substantially the same, that is, at virtual DC ground.

Potential-maintaining means 45 is a voltage divider consisting of DC voltage supply $V_1$, resistors 97, 98, and 99 connected in the manner shown above. Resistor 99 is the series-dropping resistor, resistor 97 is the bleeding resistor and resistor 98 is the load resistor. By setting the value of resistors 98 substantially greater than the value of resistor 97 (e.g.: approximately 10 times), the current flowing through resistor 98 will be much less than the current flowing through resistor 97 and 99. Thus any resistive fluctuations in the entire circuit will not cause equivalent DC potential fluctuations, which in this case would cause deleterious transients in the output waveform. The potential drop across junctions (s, q) is made equal to the drop across junctions (s, t), wherein the DC potential at (t) is a virtual ground as compared to actual ground at (q).

Frequency-determining portion B consists of resistive segments 86 and 88, and switching transistors 20 and 30, which are utilized for the two-pole switch 104 in FIG. 1, and may be of the type 2N3704. Segment 86 is connected between junction (u) and the collector 32 of transistor 30. Resistive segment 88 is connected to junction (r), which in turn is connected to emitter 33 of transistor 30. The other side of resistive segment 88 is connected to the collector 22 of transistor 20. Emitter 23 of transistor 20 is connected to ground at junction (q). Bases 21 and 31 of transistors 20 and 30, are respectively connected to resistors 82 and 84, which in turn are connected to junction 39 as is resistor 80. The other side of resistor 80 is connected to terminal 67 at which a positive DC voltage $V_2$ (e.g.: +7.5 volts) is applied. Segments 86 and 88 are substantially equal. The turn-on collector-emitter resistance of transistors 20 and 30 is substantially lower than the resistive value of segments 86 and 88 (e.g.: a few ohms). The base resistors 82 and 84 are substantially high values (e.g.: 150K ohms) in order to minimize the current flow through the switching transistors. Keying transistor 10 may be the type 2N3704 and has its collector 12 connected to junction 39, its emitter 13 grounded, and keying binary input signal applied to its base 11 from input terminal 66.

The operation of the oscillator of FIG. 2 will now be described. Amplifier 25, resistive segments 96 and 98 and reactive segments 94 and 95 function as a Wien-Bridge-type oscillator, having positive feedback via lead 45. The frequency-determining value of network 35 is established by the value of resistive segments 98, and 96 which may be approximately 2,970 ohms each, and reactive segments 94 and 95 which may be approximately 0.05 $\mu$F each. That is, branch 35a and branch 35b have substanially equal resistive and reactive segments. Additionally, the gain of the amplifier 25 is predetermined to establish unit loop gain. In this case, the forward gain required is 3. In a balanced Wein-type bridge having two resistive-reactive branches, the following relationship holds:

$$A=3$$

$$F=1/2\pi RC$$

where:

F=Frequency of the bridge
R=Resistive value of one branch of the bridge
C=Capacitive value of the same branch
A=Gain of the amplifier and where the resistive and capacitive values of the two branches are substantially equal. Therefore, the frequency is an inverse function of the resistive and reactive capacitive value in one branch (35a) of the frequency-determining portion. In order to shift the frequency of the oscillator, it is necessary to either shift the value of the resistive or reactive segments, or both, as the case may be. In this case, the resistive value is shifted. In order to maintain the balanced bridge condition, the value of the resistive segments in both branches of portion A of the network 35 must remain substantially equal, regardless of the frequency being generated. In the embodiment illustrated in FIG. 2, the resistive segments 86 and 88 are equal to each other. By coupling predetermined points such as junction (r) to junction (t), resistive segment 86 is effectively in parallel with segment 96 and segment 88 is in parallel with segment 98 with respect to AC voltage by way of decoupling capacitor 70. Segments 86 and 88 are coupled into the frequency-determining network 35 when the transistors 20 and 30 are conducting. When they are nonconducting, the AC frequency-controlled voltage is affected only by the frequency-determining value presented by frequency-determining portion A. When the transistors 20, 30 are switched on, or become conducting, the AC voltage is effected by the value presented by frequency-determining portions A and B combined. In order to prevent the generation of undesired transients, the DC component of the AC signal at points across both frequency determining branches 35a and 35b must remain substantially constant and equal. Ordinarily, switching resistive elements in and out of a circuit as well as changing the effective resistive values in the circuit generate transients as indicated previously. By establishing the DC component of the AC signal substantially the same ground potential predetermined points such as at (s, t, u, r, q) in the frequency-determining portions of network 35 and by maintaining this DC component substantially constant, this problem is avoided.

To achieve this end, voltage divider 45, which is illustrative only, and amplifier 25 establish the potential at junction (t) at virtual DC ground. This is accomplished by negative DC voltage V (e.g.: −7.5 volts) applied at terminal 69, and by the values of resistors 46, 47, 48 in conjunction with the values of resistors 97 and 99 and resistive segment 98. Note that not only is resistive segment 98 critical with respect to frequency, but it is an important component with respect to establishing the potential at junction (t), and also is the load on voltage divider 45 for maintaining constant circuit voltage. This segment accomplishes these functions without inhibiting the generation of the desired preselected first and second frequencies. Resistors 47 and 48 may have the value of approximately 1,620 ohms, and 39 ohms, while resistors 97 and 99 may have the value of 344 ohms and 680 ohms approximately. Load resistor 49 may be 6,200 ohms. Resistance 46 is determined empirically by placing an additional resistance (not shown) in parallel with 3,640 ohms. As a result, junctions (q) and (t) are virtually at the same potential (DC ground). Therefore, all intervening serially connected points such as junctions (r) and (u) will be at the same potential. Capacitor 95 blocks the DC potential at junction (u) and capacitor 70 bypasses to ground any AC signal that appears at junction (s). Resistor 80, the collector load for transistor 10, may be 3,900 ohms. By making the base resistors 82 and 84 relatively high resistance, (e.g.: 150 K ohms), relatively low current (e.g.: 50 $\mu$a.) flows through the collector-emitter circuit, presenting less than 1 percent distortion.

Normally, the applied voltage at terminal 67 (e.g.: +7.5 volts) biases transistors 20 and 30 on. This couples frequency determining portion B with portion A, presenting a lower resistive value and generating a second higher frequency. When a binary input signal is applied to base 11 of transistor 10, the higher of the two binary levels turns transistors 10 on which then conducts. The potential at junction 39 goes to ground and transistor 20 and 30 are switched off. At this time, the frequency-determining network consists only of branches 35a and 35b, presenting a higher resistive value and generating a first lower frequency. The output signal is taken from terminal 68, which signal consists of a waveform rapidly alternating between two frequencies without transients.

What is claimed is:

[1. A frequency shift oscillator comprising, a first resistive-capacitive frequency-determining circuit by which said oscillator operates at a first frequency, a second circuit which when coupled across a portion of said first circuit between predetermined points in said first circuit results in said oscillator operating at a second frequency, said second circuit having input and output terminals, means for selectively coupling said second circuit at said terminals between said points in said first circuit, and means coupled to said first and second circuits for establishing and maintaining substantially the same constant potential at said input and output terminals and said points irrespective of whether or not said second circuit is coupled between said points in said first circuit, thereby avoiding transients in the output of said oscillator which would otherwise occur if the potential at any of said points and terminals differed when the frequency of said oscillator is randomly shifted.]

[2. A frequency shift oscillator as claimed in claim 1 and wherein said first circuit includes a resistive and capacitive element connected in series, said second circuit including a resistive element connected between said terminals to cause said oscillator to operate at said second frequency higher than said first frequency when said second circuit is selectively coupled to said first circuit.]

[3. A frequency shift oscillator as claimed in claim 1 and wherein said coupling means includes a switching means connected in series with said second circuit between said points in said first circuit, and means for placing said switching means in one state to couple said second circuit between said points in said first circuit and in a second state to remove said second circuit from between said points.]

[4. A frequency shift oscillator comprising, a first frequency-determining circuit by which said oscillator operates at a first frequency, said first circuit including a first resistive element in series with a second resistive element, a second circuit including a switching means in series with a resistance, said second circuit when coupled across said first and second resistive elements causing said oscillator to operate at a second frequency, said second circuit having input and output terminals, means for placing said switching means in one state to couple said second circuit across said first and second resistive element and in a second state to remove said second circuit from across said first and second resistive elements, and means coupled to said circuits for establishing and maintaining substantially the same constant potential at said terminals of said second circuit and at the ends of the series circuit formed by said first and second resistive elements irrespective of whether or not said second circuit is coupled across said series circuit.]

[5. A frequency shift oscillator as claimed in claim 4 and wherein said second circuit includes a first switching device in series with a third resistive element, the series arrangement of said first device and said third resistive element being connected across said first resistive element, and further including a second switching device in series with a fourth resistive element, the series arrangement of said second device and said fourth resistive element being connected across said second resistive element, said placing means serving to selectively operate said switching devices to complete the connection of said third resistive element through said first device across said first resistive element and the connection of said fourth resistive element through said second device across said second resistive element.]

[6. A frequency shift oscillator comprising:

a first frequency-determining circuit including a plurality of resistive and reactive frequency-determining elements interconnected for causing said oscillator to operate at a first frequency and further including at least two points at predetermined locations therein, at least one of said elements being connected between said two points, a second circuit having input and output terminals each respective one of which is coupled to a separate one of said two points and including at least one resistive element connected between said terminals for shifting the frequency-determining value presented by said one element in said first circuit for causing said oscillator to operate at a second frequency, means coupled to said circuits for establishing and maintaining substantially the same constant potential at said two points and at said input and output terminals, which potential, if permitted to fluctuate or differ as between any of said points and said terminals, would cause transients to be generated when the frequency of said oscillator is randomly shifted, and switching means having two states for selectively coupling said second circuit to said first circuit at said points and terminals in only one of said states for controlling the generation by said oscillator of either one of said first and second frequencies.]

[7. A frequency shift oscillator, comprising:

a first circuit including a plurality of frequency-determining elements for generating a first frequency and having a plurality of points at predetermined locations therein, at least one of said elements being connected between one pair of said points, and another of said elements being connected between a second different pair of said points, a second circuit having a like number of points at predetermined locations therein and including at least one frequency-determining element connected between one pair of said second circuit points and another frequency-determining element connected between a second different pair of said second circuit points, said one frequency-determining element in said second circuit when coupled across said one element in said first circuit at said one pair of points and said other frequency-determining element in said second circuit when coupled across said other element in said first circuit at said second pair of points serving to shift the value of said elements in said first circuit causing said oscillator to operate at a second frequency;

means coupled to said first and second circuits for establishing and maintaining substantially the same constant potential at all of said points, which potential if permitted to fluctuate or differ between any of said points when the value of said one element is shifted, would cause transients to be generated, and switching means for selectively coupling said second circuit to said first circuit at said points for controlling the generation by said oscillator at either one of said first and second frequencies.]

*8. A frequency shift oscillator including an amplifier comprising:*

*a first resistive-capacitive frequency-determining circuit D.C. coupled to said amplifier by which said oscillator operates at a first frequency,*

*a second circuit which when coupled across a portion of said first circuit between predetermined points in said first circuit results in said oscillator operating at a second frequency, said second circuit having input and output terminals,*

*means for selectively coupling said second circuit at said terminals between said points in said first circuit, and*

*means coupled to said first and second circuits for establishing and maintaining substantially the same constant potential at said input and output terminals and said points irrespective of whether or not said second circuit is coupled between said points in said first circuit, thereby avoiding transients in the output of said oscillator which would otherwise occur if the potential at any of said points and terminals differed when the frequency of said oscillator is randomly shifted.*

*9. A frequency shift oscillator including an amplifier comprising,*

*a first frequency-determining circuit D.C. coupled to said amplifier by which said oscillator operates at a first frequency, said first circuit including a first resistive element in series with a second resistive element,*

*a second circuit including a switching means in series with a resistance, said second circuit when coupled across said first and second resistive elements causing said oscillator to operate at a second frequency, said second circuit having input and output terminals,*

*means for placing said switching means in one state to couple said second circuit across said first and second resistive elements and in a second state to remove said second circuit from across said first and second resistive elements, and*

*means coupled to said circuits for establishing and maintaining substantially the same constant potential at said terminals of said second circuit and at the ends of the series circuit formed by said first and second resistive elements irrespective of whether or not said second circuit is coupled across said series circuit.*

*10. A frequency shift oscillator including an amplifier comprising:*

*a first frequency-determining circuit D.C. coupled to said amplifier including a plurality of resistive and reactive frequency-determining elements interconnected for causing said oscillator to operate at a first frequency and further including at least two points at predetermined locations therein, at least one of said elements being connected between said two points,*

*a second circuit having input and output terminals each respective one of which is coupled to a separate one of said two points and including at least one resistive element connected between said terminals for shifting the frequency-determining value presented by said one element in said first circuit for causing said oscillator to operate at a second frequency,*

*means coupled to said circuits for establishing and maintaining substantially the same constant potential at said two points and at said input and output terminals which potential, if permitted to fluctuate or differ as between any of said points and said terminals, would cause transients to be generated when the frequency of said oscillator is randomly shifted and*

*switching means having two states for selectively coupling said second circuit to said first circuit at said points and terminals in only one of said states for controlling the generation by said oscillator of either one of said first and second frequencies.*

*11. A frequency shift oscillator including an amplifier, comprising:*

*a first circuit D.C. coupled to said amplifier including a plurality of frequency-determining elements for generating a first frequency and having a plurality of points at predetermined locations therein, at least one of said elements being connected between one pair of said points, and another of said elements being connected between a second different pair of said points,*

*a second circuit having a like number of points at predetermined locations therein and including at least one frequency-determining element connected between one pair of said second circuit points and another frequency-determining element connected between a second different pair of said second circuit points, said one frequency-determining element in said second circuit when coupled across said one element in said first circuit at said one pair of points and said other frequency-determining element in said second circuit when coupled across said other element in said first circuit at said second pair of points serving to shift the value of said elements in said first circuit causing said oscillator to operate at a second frequency,*

*means coupled to said first and second circuits for establishing and maintaining substantially the same constant potential at all of said points, which potential, if permitted to fluctuate or differ between any of said points when the value of said one element is shifted, would cause transients to be generated, and*

*switching means for selectively coupling said second circuit to said first circuit at said points for controlling the generation by said oscillator at either one of said first and second frequencies.*

*12. A frequency shift oscillator as claimed in claim 8 and wherein said first circuit includes a resistive and capacitive element connected in series,*

*said second circuit including a resistive element connected between said terminals to cause said oscillator to operate at said second frequency higher than said first frequency when said second circuit is selectively coupled to said first circuit.*

*13. A frequency shift oscillator as claimed in claim 8 and wherein said coupling means includes a switching means connected in series with said second circuit between said points in said first circuit, and*

*means for placing said switching means in one state to couple said second circuit and in a second state to remove said second circuit from between said points.*

*14. A frequency shift oscillator as claimed in claim 9 and wherein said second circuit includes a first switching device in series with a third resistive element, the series arrangement of said first device and said third resistive element being connected across said first resistive element, and further including a second switching device in series with a fourth resistive element, the series arrangement of said second device and said fourth resistive element being connected across said second resistive element,*

*said placing means serving to selectively operate said switching devices to complete the connection of said third resistive element through said first device across*

*said first resistive element and the connection of said fourth resistive element through said second device across said second resistive element.*

References Cited

The following references, cited by the Examiner, are of record in the patented file of this patent or the original patent.

UNITED STATES PATENTS

| | | | |
|---|---|---|---|
| 2,617,035 | 11/1952 | Janssen et al. | 331—179 |
| 3,514,717 | 5/1970 | Rose et al. | 331—179 X |
| 3,363,204 | 1/1968 | Kageyama et al. | 325—163 X |

FOREIGN PATENTS

| | | | |
|---|---|---|---|
| 1,151,011 | 7/1963 | Germany | 331—179 |
| 1,093,538 | 12/1967 | Great Britain | 331—179 |
| 1,109,450 | 4/1968 | Great Britain | 331—179 |

ALFRED L. BRODY, Primary Examiner

U.S. Cl. X.R.

332—9 T, 16 T